United States Patent [19]

El-Amawy

[11] Patent Number: 5,163,068
[45] Date of Patent: Nov. 10, 1992

[54] ARBITRARILY LARGE CLOCK NETWORKS WITH CONSTANT SKEW BOUND

[76] Inventor: Ahmed El-Amawy, 1246 Wyatt Dr., Baton Rouge, La. 70810

[21] Appl. No.: 660,420

[22] Filed: Feb. 22, 1991

[51] Int. Cl.⁵ .............................................. H04L 7/04
[52] U.S. Cl. .................................. 375/107; 370/100.1
[58] Field of Search ............................ 328/63; 360/26; 370/100.1, 105, 108; 371/1; 375/106, 107, 111; 455/51

[56] References Cited

U.S. PATENT DOCUMENTS

| | | | |
|---|---|---|---|
| 3,725,793 | 4/1973 | Phillips | 370/105 |
| 4,580,243 | 4/1986 | Renner et al. | 375/107 |
| 4,700,347 | 10/1987 | Rattberg | 371/1 |
| 5,051,990 | 9/1991 | Kato | 375/107 |

OTHER PUBLICATIONS

Seitz, "System Timing," ch. 7 in Mead et al. (eds.), Introduction to VLSI Systems (1980).
Kugelmass and Steiglitz, "An Upper Bound on Expected Clock Skew in Synchronous Systems," IEEE Trans. Comput., vol. C-39, No. 12, pp. 1475-1477 (Dec. 1990).
Hoshino, "Pax Computer; High-Speed Parallel Processing and Scientific Computing," §8.3 (1985).
Fisher and Kung, "Synchronizing Large VLSI Processor Array," Proc. 10th Ann. Intl. Symp. Comp. Arch., pp. 54-58 (1983).
El-Amawy, "Properties of Branch-And-Combine Clock Networks," Tech. Report #09-91C-AE, Louisiana State University, Elect. & Compt. Engr. Dept. (1991).

Primary Examiner—Benedict V. Safourek
Attorney, Agent, or Firm—John H. Runnels

[57] ABSTRACT

Global synchronization of an arbitrarily large computing structure, such that the clock skew between any two communicating cells is bounded by a constant, regardless of the size of the structure. The invention uses clock nodes to perform simple processing on clock signals. The clock signal is processed in a manner similar to that in which data signals are typically processed. A cyclic, or partially cyclic, network of the clock nodes, within certain topological constraints, along with timing constraints on the function of the clock nodes, maintains a constant bound on the skew.

33 Claims, 17 Drawing Sheets

○ CLOCK NODE
● DATA CELL

ARBITRARILY LARGE CLOCK NETWORKS WITH CONSTANT SKEW BOUND

BACKGROUND OF THE INVENTION

This invention pertains to skew bound in synchronous computing structures, particularly to arbitrarily large computing structures with a constant skew bound.

The simplest way to control pipelined and concurrent computing structures, such as arrays, parallel processors, multiprocessors, and vector processors is to use a global clock to connect computation sequence to time. This method results in "synchronous" computations, and is widely used in many applications, including VLSI implementations. Many computing applications require a consistent view of time across all computing cells or processors, which can be achieved by using a global clock.

The problem of clock skew has long been recognized as a major obstacle to implementing very large synchronous systems—systems employing thousands, millions, or more individual computing units, or processing cells. Ideally, one clocking event should arrive at each affected cell simultaneously. However, a number of factors can cause variations in these arrival times: different threshold voltages, different signal propagation delays on wires due to their resistances and capacitances, different buffer delays, etc. Thus effective clock arrival times may vary from cell to cell, or even from component to component on a single chip. The term "clock skew" refers to the difference in arrival times of a single clocking event or clock pulse at different cells. For general background see Seitz, "System Timing," ch. 7 in Mead et al. (eds.), Introduction to VLSI Systems (1980), which is incorporated by reference.

Larger skews require slower clock rates for a synchronous system to operate properly. A general (but somewhat simplified) condition is that the clock period should be at least equal to the sum of (1) the time to distribute the clock signal, (2) the time to perform the computation, and (3) the maximum clock skew between any two cells which communicate directly with one another. To the knowledge of the inventor, in nearly all prior clock distribution schemes for synchronous systems, clock skew grows without bound as the system size grows—in all prior structures of two or more dimensions, and in nearly all prior one-dimensional arrays as well.

Several studies have estimated the effects of system size increase on synchronization and skew. The most optimistic estimate known to the inventor is found in Kugelmass and Steiglitz, "An Upper Bound on Expected Clock Skew in Synchronous Systems," IEEE Trans. Comput., vol C-39, no. 12, pp. 1475-1477 (December 1990), not admitted to be prior art. The statistical upper bound on skew was theoretically predicted to grow on the order of $N^{\frac{1}{4}}(\log N)^{\frac{1}{2}}$, where N is the number of processors. To the knowledge of the inventor, no prior clock distribution scheme in a structure of more than one dimension predicts or guarantees a constant upper bound on clock skew, regardless of system size.

For very large systems, clock skew is a nontrivial problem which can significantly slow the clock rate which is otherwise possible, or which can render a synchronous discipline impractical. For a discussion of the practical significance of this problem, see Hoshino, "Pax Computer; High-Speed Parallel Processing and Scientific Computing," §8.3 (1985). Prior approaches to minimizing the effects of clock skew have included equalization of wire lengths, careful screening of off-the-shelf parts, symmetric design of the distribution network, design guidelines to reduce skew due to process variations, and digital phase adjustment.

One method which has been suggested for certain high-speed systems uses a number of delay lines to shift the phase of an incoming signal (at a utilization circuit) by different values. One of the delay line outputs is selected such that the signal arriving at the utilization circuitry has the proper phase to reduce sampling errors. See U.S. Pat. No. 4,700,347. The circuit described in this reference cannot, however, be used for clock distribution. One copy of the circuit is required for every signal arriving at the utilization circuitry with an unknown phase, which makes this method relatively complex and costly. Further, due to lack of synchronism between the incoming signal and the utilization circuitry, a metastable failure is possible.

Fisher and Kung, "Synchronizing Large VLSI Processor Arrays," Proc. 10th Ann. Intl. Symp. Comp. Arch., pp 54-58 (1983); which also appears in IEEE Trans. Comp., Vol. C-34, No. 8, pp. 734-740 (August 1985), investigated clock skew in large two-dimensional arrays clocked by an "H-tree" network. The H-tree structure places each computing cell at approximately the same physical distance from the source of the clock signal. Fisher and Kung concluded that constant skew bound could not be achieved in two-dimensional arrays clocked this way. They found that certain one-dimensional arrays could be clocked such that skew is bounded by a constant.

Alternative methods have been proposed for controlling very large computing structures—these alternative methods include asynchronous modes, hybrid synchronous/asynchronous modes, self-timing, handshake protocols, and analog phase-locked loops. These methods are generally more complex and more costly to implement than is a purely synchronous method. In addition, in most of these alternative methods there is always a finite probability of a metastable failure due to the inability to guarantee the safe timing requirements of latches and flip-flops. Moreover, the synchronous discipline, the most widely used discipline in digital systems, can potentially provide faster processing rates than can its alternatives. To the knowledge of the inventor, no previous work has successfully achieved constant skew bound in an arbitrarily large, synchronous, two- or higher-dimensional network.

SUMMARY OF THE INVENTION

A novel synchronous clock distribution system has been discovered which is both simple to implement and efficient to use. The novel system makes it possible to assure a constant skew bound, and therefore tight synchronization and a consistent view of time between any two communicating cells (or processors), regardless of the size of the network.

The clock network requires only one clock source, which makes it attractive for many synchronous system applications. For example in multiprocessing systems, using a single clock source automatically provides different processors with a consistent and precise view of time, in addition to providing tight synchronization. Consequently the possibility of a metastable failure is eliminated. It is also very attractive for VLSI or WSI implementations, because the crystal used to control the clock frequency may then be external to the chip or wafer. No handshaking is required, so that clocking rates may be faster than is the case in systems using handshaking protocols, and circuits may likewise be simpler. Furthermore, the single global clock source can generally be attached to more than one node in the clock network, greatly increasing system layout flexibility. A consequence is that a number of equivalent network topologies are therefore equally valid. The degrees of freedom in signal routing choices are thus enhanced.

This system is based on the premise of "clock processing." Clock signals are distributed, combined, and processed in a network of clock nodes in much the same way as data signals are processed among data nodes. Starting from a single clock source, the clock signal is distributed to neighboring clock nodes, which in turn act as sources to neighboring clock nodes, etc., throughout the network. Clock nodes will usually receive inputs from at least two other clock nodes each, which are then combined into one signal through specific timing constraints. This signal then clocks one or more associated data cells, and is also sent to neighboring clock nodes. The process repeats until all cells are clocked. This principle may be termed "branch-and-combine."

There are constraints in this system on network topology, timing restrictions, and node function. These constraints interact with one another. For example, the selection of a specific clock network topology affects the timing constraints, as does the selection of a particular node design. Conversely, the selection of a particular upper skew bound may affect the choice of topology, timing constraints, or node function. These constraints are discussed in more detail below.

The inputs to each clock node are combined (or processed) to produce a single output signal, which in turn is sent to associated data-processing cells and to neighboring clock nodes. This combination of inputs does not involve phase-locked loops or handshake protocols. Instead, the first arriving input from a given clocking event triggers the node's action, which results in an output pulse. Proper timing constraints on signals and node function result in the desired behavior. These restrictions are simple and practical to implement.

The clock node network topology is also important. Each pair of clock nodes associated with a pair of communicating data cells must be: (1) clocked by the same clock node; or (2) clocked by a pair of associated clock nodes linked to one another in a directed and closed cycle of finite length; or (3) clocked indirectly, via intermediate nodes or buffers, by the same clock node; or (4) clocked by a pair of clock nodes, which in turn are clocked (directly or via intermediate nodes or buffers) by a pair of predecessor clock nodes, where the predecessor nodes are linked to one another in a directed and closed cycle of finite length. Each of these four conditions is equally valid. The greatest lower bound on such cycle lengths is a major factor in determining the upper bound on clock skew, and also affects the node function. In general, the shorter this bound on cycle length, the smaller the upper bound on skew will be. Because of the cyclic nature of the DC-Class of network (defined below), the clock source in such a network may be input to any clock node, without affecting the skew bound or the correctness of network function. This and other features of the network allow fault-tolerance. In addition, the clock nodes will provide a buffering function.

If the order in which the inputs arrive at a node does not change with time, then only the first arriving input need be considered, and the other inputs may be permanently ignored or fused out. Such a "fuse-programmed" network can increase the speed of the network.

Several two-dimensional networks embodying the present invention, and one multidimensional network, are described in detail below.

The invention is efficient because skew bound can be limited to a few nanoseconds using current technology.

DETAILED DESCRIPTION OF THE INVENTION

To distinguish between a clock-processing entity and a data-processing entity, the former will be called a "clock node" or "node," and the latter will be called a "data cell," "cell," or "processor."

The clock distribution network is cyclic in nature. In a DC-Class Network (defined below), any two directly communicating cells must either be clocked by the same node, or by two nodes which are part of at least one cycle. A "cycle" comprises a closed, directed path of nodes and links such that no node is repeated. For example, the networks of FIGS. 2, 3, and 4 contain many cycles. The network of FIG. 12 contains no cycles, because following no sequence of nodes and directed links in FIG. 12 (the arrows) leads back to any previous node (the circles) in the path followed.

In general, each node will have at least two inputs. There can be exceptions, however, including possibly nodes connected to or near the clock source (total skew being relatively small after propagation through only a few nodes and links), nodes on a corner or an edge of the network, nodes in a network which has been "fuse-programmed," and some of the nodes in an "IC-Class" network (defined below).

A clock node will respond to the first change of state it receives on any of its inputs. (In most of the examples below, a change of state is a 0→1 transition, but it could be a 1→0 transition, or could take other forms as well, forms which would be apparent to those skilled in the art.) The node then ignores subsequent changes of state received during the time of one clock period. A change of state which thus causes a response from a clock node may be called a triggering event.

The node's response takes the form of an output signal as described below. The output signal produced by a clock node comprises two parts. In most of the examples below, the first part is a high part or a 1, and the second part is a low part or a 0. The first part must be longer than the maximum skew between any two inputs to the same node.

The duration of the high voltage part of the output clock signal produced by a clock node, or by the clock source, must be longer than the maximum skew between any two inputs to the same node. That skew is in turn a function of the maximum skew between any two inputs to the same node.

Figure 1:
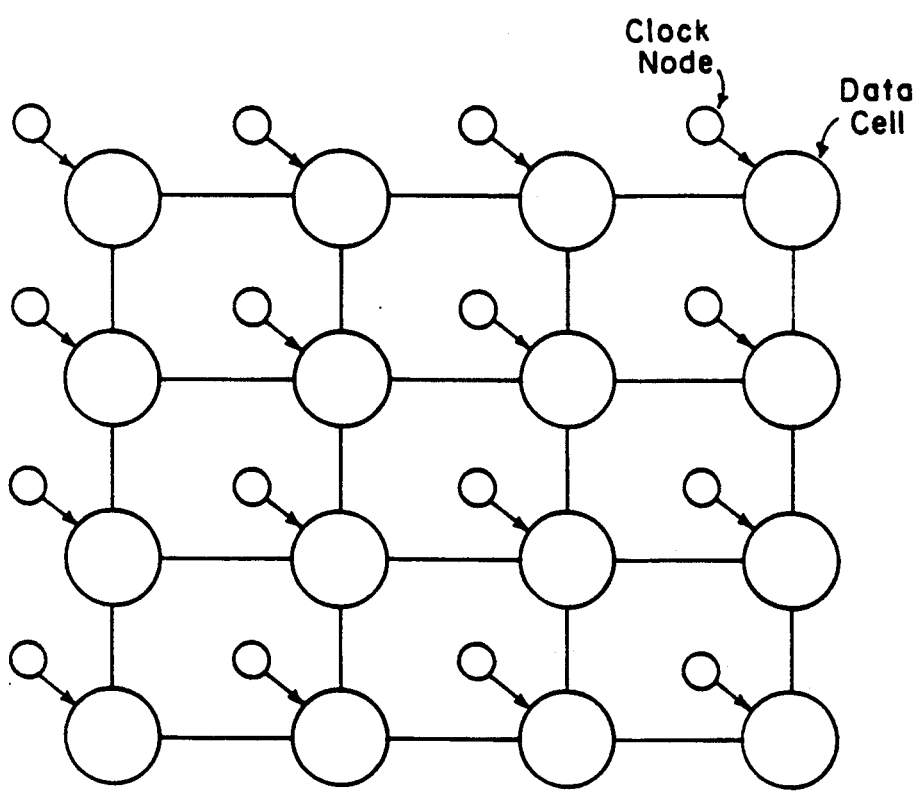
FIG. 1 illustrates generically a network of data cells and clock nodes, with one clock node associated with each data cell.

In one type of embodiment, illustrated generically in FIG. 1, one clock node is associated with each data cell. However, it is possible to have each node clock several cells, as will be discussed below. Further, it is not necessary that the clock network be identical to the data cell network.

Two general functions of a clock node are (1) to create a local reference for neighboring nodes, and (2) to process the clock signal inputs and produce an output signal which adheres to the timing constraints.

Each of the three, two-dimensional, DC-Class network embodiments described below has different cost/performance characteristics. In one embodiment, each interior node has degree 2; in another embodiment, degree 3; and in a third, degree 4. The multi-dimensional embodiment described below illustrates yet another cost/performance characteristic.

In a preferred DC-Class embodiment, the indegree equals the outdegree at each node, with the possible exception of nodes lying on the edges of the network or near the clock source, i.e., fan-in=fan-out=F. It has been discovered that, at least for some two-dimensional structures, it is possible to design the system such that the upper bound on clock skew is $(5-F)\Delta$, where $\Delta = \max$ (node delay + link delay).

For clarity, the illustrated embodiments in all figures other than FIGS. 1, 9, 11, and 16 show only the topology of the clock nodes and their interconnections, and do not depict the locations and connections of the data cells.

EXAMPLE 1

Figure 2:
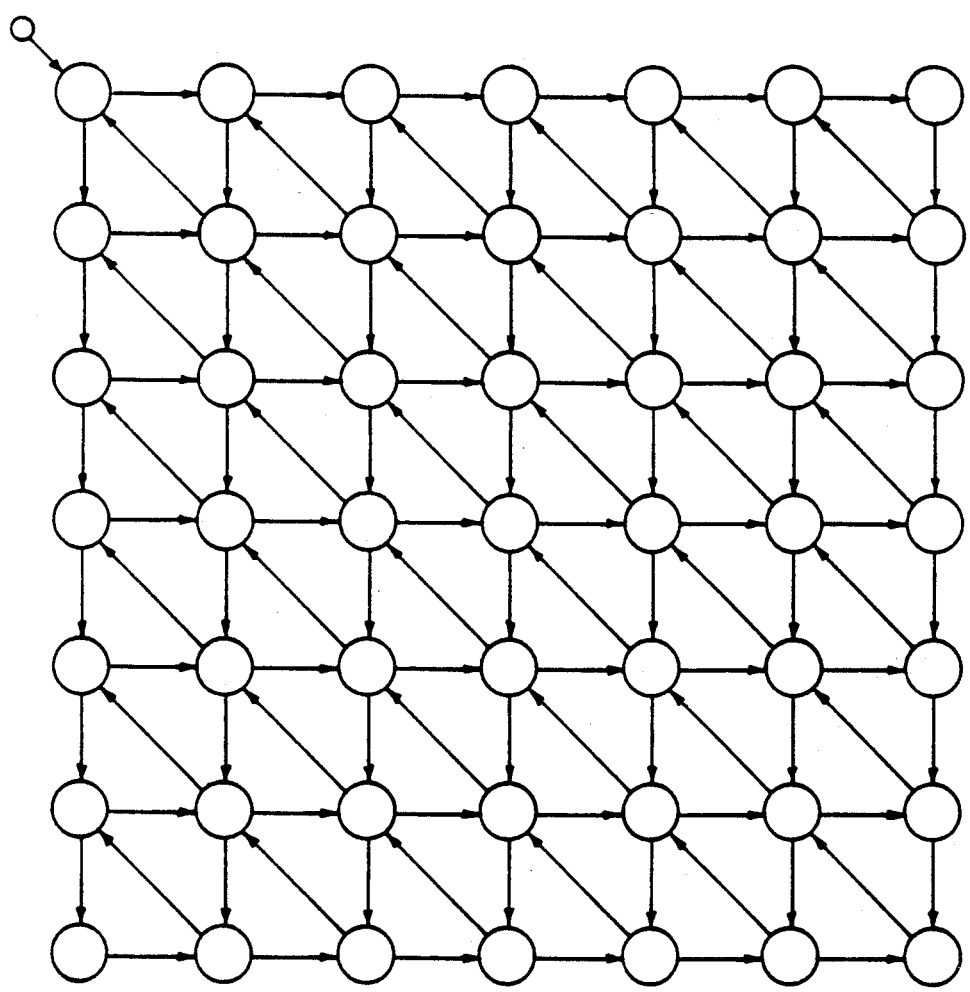
FIG. 2 illustrates an embodiment of a two-dimensional, DC-Class clock network in accordance with the present invention, with $F=3$.

FIG. 2 illustrates an embodiment in which the nodes are connected in a mesh fashion, such that each node is connected to six neighbors (except on the edges of the network), i.e., F=3. The system is purely synchronous, and the nodes do not handshake. A singleshot node design will be used, although other node designs are also possible. Node design issues are discussed further below.

Because the network is cyclic, one might suspect that the network could oscillate-which it could without appropriate timing constraints. However, with appropriate timing constraints, the network does not oscillate; and in fact the cyclic nature of the network is important to a constant skew bound. (This condition can be partly relaxed, as discussed below.)

The singleshot used as part of a node in the embodiment illustrated in FIG. 2 is a positive edge triggered, nonretriggerable singleshot. (See FIG. 13(a).) In other words, triggering the singleshot with a 0→1 transition gives a high output whose length may be selected as desired. Input pulses received during the duration of the output pulse are disregarded. The minimum time that must lapse between the end of an output pulse and the next successful triggering of the singleshot will be considered the "setup" time of the singleshot.

The following six conditions are imposed on the network of FIG. 2:

(1) System operation begins at a specified time $t_o$. Alternatively, events before time $t_o$ are disregarded, and the system is reset at $t_o$.

(2) The clock source produces a stream of pulses starting at time $t_o$. The timing of these pulses must meet certain constraints. The duration $T_h$ of the high portion of the pulse must be at least $$3\Delta + \mu \leq T_h \leq 3\Delta + \mu'$$

and the duration $T_l$ of the low portion of the pulse must be at least $$T_l > 3\Delta + \mu' + \lambda - \mu$$

where $\Delta$ is the sum of the maximum delay through a node plus the maximum delay through a node plus the maximum delay through a link, where $\mu$ and $\mu'$ are arbitrary positive time intervals such that $\mu' > \mu$, and where $\lambda$ is the setup time for the singleshot. Because several different node designs are possible, $\lambda$ will hereafter refer more generally to the node setup time. The bounds on $T_h$ and $T_l$ are dependent on the particular network topology and node design. (For a network designed with nodes that respond to 1→0 transitions, $T_h$ and $T_l$ would be exchanged in the above expressions.)

(3) The clock distribution network has the general topology as that shown in FIG. 2 (but need not be identical to the network of FIG. 2). (Other networks are also possible, as discussed below.)

(4) All outputs of a given node are essentially identical.

(5) Node delay + link delay = $\alpha \pm \beta$, such that $\Delta = \alpha + \beta$. This condition allows network delays to vary from node to node and link to link. These variations may be due to temperature, aging, manufacturing, and power supply voltages. This condition also allows delays to vary over time, so long as such changes occur relatively slowly, as is the case in digital systems. For details see El-Amawy, "Properties of Branch-And-Combine Clock Networks," Tech. Report #09-91C-AE, Louisiana State University, Elect. & Compt. Engr. Dept (1991), which is incorporated by reference.

(6) Each node functions as follows: When a triggering event is received, the node will produce an output pulse which conforms to the same timing constraints for $T_h$ and $T_l$ as defined in condition 2 above. Transitions from other inputs received in a time less than $T_C$ following the most recent triggering event are ignored, where the minimum clock period $T_C$ is $$T_C = \check{T}_h + \check{T}_l = (3\Delta + \mu) + (3\Delta + \mu' + \lambda - \mu)$$
$$= 6\Delta + \mu' + \lambda$$

Of course, the clock period used must be long enough to permit the data cells to perform their functions.

Theorems proven by the inventor, El-Amawy, "Clocking Arbitrarily Large Computing Structures Under Constant Skew Bound," paper submitted to IEEE Trans. on Parallel and Distributed Systems (1991); and El-Amawy, "Properties of Branch-And-Combine Clock Networks," Tech. Report #09-91C-AE, Louisiana State University, Elec. & Compt. Engr. Dept. (1991); both of which are incorporated by reference, prove that under the above six conditions, the following four conclusions may be reached:

(1) The clock network will not oscillate.

(2) Different clocking events will not intersect one another, i.e., the different clocking events will arrive sequentially at each node and each cell in their proper order.

(3) The maximum clock skew between any two communicating cells is $2\Delta$, if it is assumed that the delay from a node to an associated cell is negligible. (This assumption is relaxed below.)

(4) The maximum skew between any two inputs to the same node is $3\Delta$.

The network used in this example is not unique. Other clock distribution topologies, based on the same or similar principles, may be devised. However, not every topology will work. A necessary condition for a constant upper bound on skew, regardless of network size, is that the network graph must contain cycles. Another condition is that if two data cells or processors communicate directly with one another, then the clock nodes associated with those data cells must be: (1) the same; or (2) both part of a single cycle of finite length; or (3) driven (directly or indirectly) by the same predecessor node, or by a pair of predecessor nodes, where the predecessor nodes are part of a single cycle of finite length. For a regular network, the shorter the minimum length of such a cycle is, the smaller the constant upper bound on skew may be. For an irregular network, the shorter is the greatest lower bound on the length of such a cycle, the smaller the constant upper bound on skew may be.

A "brute force" method of ensuring a proper network topology is to place any two clock nodes in a 2-cycle if their corresponding data cells communicate with one another. See, e.g., FIG. 3.

Note that the clock nodes can provide a buffering function.

EXAMPLE 2

Figure 3:
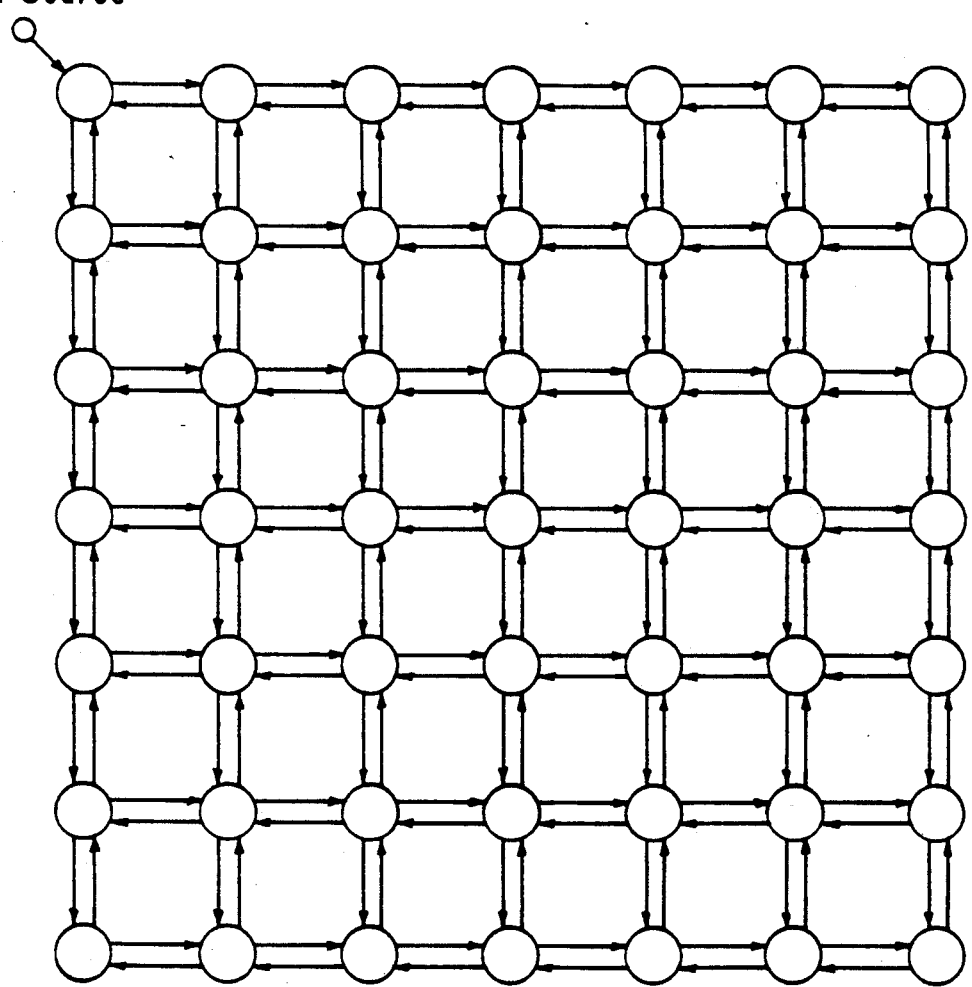
FIG. 3 illustrates an embodiment of a two-dimensional, DC-Class clock network in accordance with the present invention, with $F=4$.

FIG. 3 illustrates a second embodiment of a network topology in accordance with the present invention. In this network, F=4, and any pair of nodes associated with a pair of communicating cells is included in a cycle of length 2.

The six conditions of Example 1 are imposed on this network, except that the time intervals $T_h$ and $T_l$ are as follows:

$$\mu + 2\Delta \leq T_h \leq 2\Delta + \mu'$$

$$T_l > 2\Delta + \mu' + \lambda - \mu$$

The four conclusions reached in Example 1 also apply, except that the maximum clock skew between two communicating cells is $\Delta$, and the maximum skew between any two inputs to the same node is $2\Delta$.

The minimum clock period $T_C$ for this network is $4\Delta + \mu' + \lambda$. Compared to the network of FIG. 2, the network of FIG. 3 allows for a faster clock and lower skew bound, but requires approximately a 33% greater number of connections per node.

EXAMPLE 3

Figure 4:
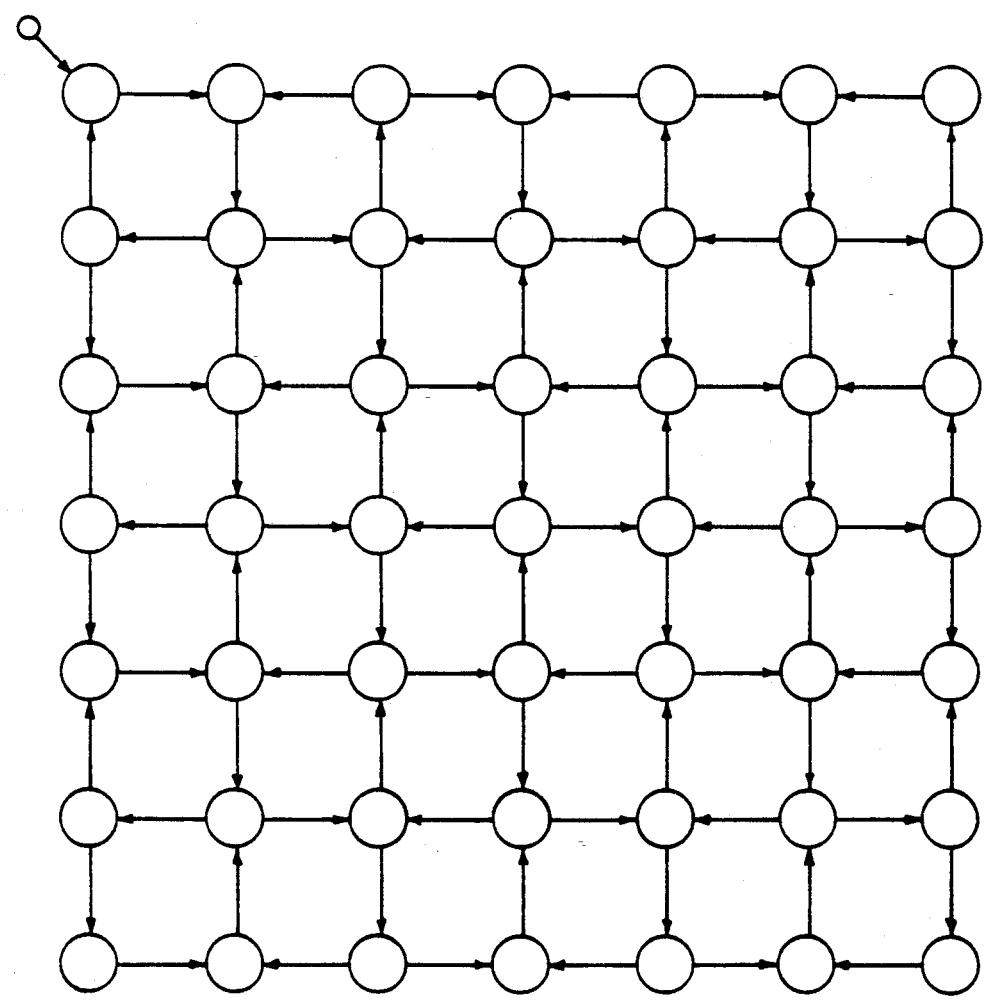
FIG. 4 illustrates an embodiment of a two-dimensional, DC-Class clock network in accordance with the present invention, with $F=2$.

FIG. 4 illustrates a third embodiment of a network topology in accordance with the present invention. In this network, F=2, and any pair of nodes associated with a pair of communicating cells is included in a cycle of length 4.

The six conditions of Example 1 are imposed on this network, except that the time intervals $T_h$ and $T_l$ are as follows:

$$\mu + 4\Delta \leq T_h \leq 4\Delta + \mu'$$

$$T_l > 4\Delta + \mu' + \lambda - \mu$$

The four conclusions reached in Example 1 also apply, except that the maximum clock skew between two communicating cells is $3\Delta$, and the maximum skew between any two inputs to the same node is $4\Delta$.

The minimum clock period $T_C$ for this network is $8\Delta + \mu' + \lambda$. Compared to the networks of FIGS. 2 and 3, the network of FIG. 4 requires a slower clock and a higher skew bound, but requires fewer connections per node.

Table 1 summarizes the main parameters for each of these three examples, and illustrates the tradeoffs between clock speed and skew bound on the one hand, and the number of connections or wires on the other hand.

TABLE 1

| Network | Maximum Skew between communicating cells | Maximum skew between any two inputs to a node | Minimum clock period |
|---|---|---|---|
| F = 2 | $3\Delta$ | $4\Delta$ | $8\Delta + \mu' + \lambda$ |
| F = 3 | $2\Delta$ | $3\Delta$ | $6\Delta + \mu' + \lambda$ |
| F = 4 | $\Delta$ | $2\Delta$ | $4\Delta + \mu' + \lambda$ |

Each of the networks of Examples 1, 2, and 3 was simulated on Encores' Multimax super minicomputer using Turbo C programming language. A 500×500 network was used in each case. Node and link delays were lumped together as "output link delays." A random output link delay ranging from 7 to 15 units of time was assigned to each link using a random number generator. (The values 7 to 15 were arbitrary.) The following properties were checked: lack of oscillation, maximum skew between node inputs, and maximum skew between neighboring nodes. In each case, the simulation results completely matched theoretical expectations.

Figure 15A:
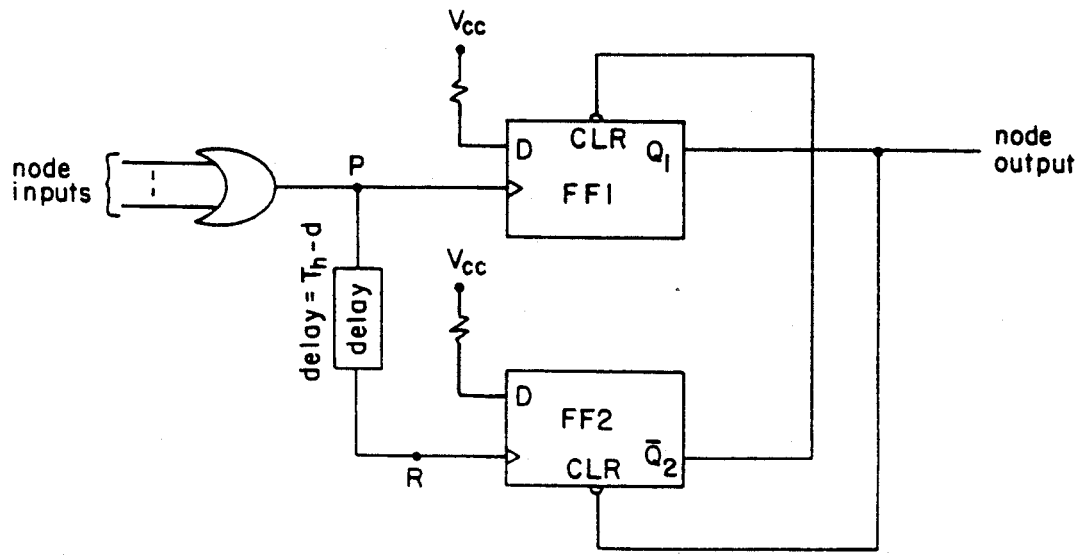
FIGS. 15(a) and 15(b) illustrate the structure and function, respectively, of a flip-flop-based clock node which may be used in the present invention.

Although this invention had not been tested for constant skew bound in a large-scale network by the time this application was filed (other than in the above simulation), a 4×4 F=3 network made of SSI chips was built in accordance with the embodiment of Example 1 above, except that the node design illustrated in FIG. 15(a) was used. The network operated properly at 8 MHz, and did not oscillate. The network also operated properly after attaching the clock source to any one of the sixteen network nodes.

EXAMPLE 4

This fourth embodiment illustrates the utility of the invention in computing structures of arbitrary dimensionality and size. It also demonstrates how a single node can be used to clock several data cells (or processors), with the node-to-cell delay assumed to be nonzero.

Figure 5A:
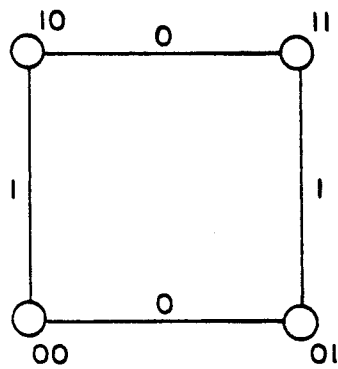
FIGS. 5(a), 5(b), and 5(c) illustrate 2-, 3-, and 4-dimensional hypercubes, respectively.
Figure 5B:
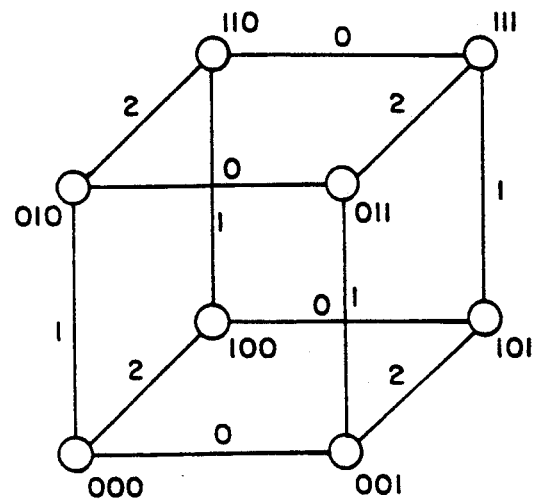
Figure 5C:
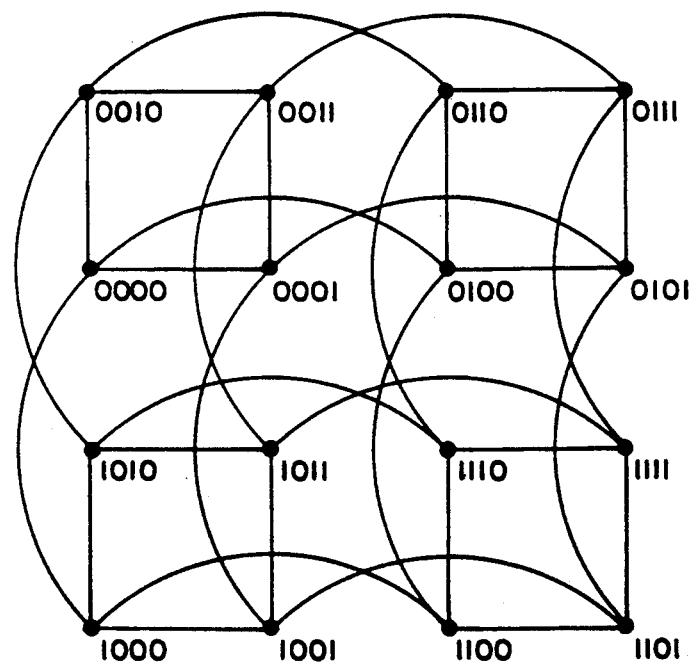

An $\eta$-dimensional hypercube (also known as an $\eta$-cube, binary cube, or Boolean cube) consists of $2^\eta$ cells labeled 0 through $2^\eta-1$. Each cell is connected to exactly $\eta$ neighbors, such that two cells are directly connected if and only if their binary labels differ in exactly one bit. FIGS. 5(a), 5(b), and 5(c) illustrate 2-, 3-, and 4-dimensional hypercubes, respectively.

An $\eta$-dimensional hypercube can be partitioned into $2^{\eta-\kappa}$ subcubes of dimension $\kappa$ each; $\kappa \leq \eta$. In such a case each subcube would contain $2^\kappa$ cells. One method of partitioning is to consider the binary address of a cell, $A = a_{\eta-1}a_{\eta-2}\ldots a_\kappa a_{\kappa-1}\ldots a_1$, as having two parts. Bits 0 through $a_{\kappa-1}$ represent the in-subcube label (or address), whereas bits $\kappa$ through $\eta-1$ represent the subcube label (or address).

Figure 6:
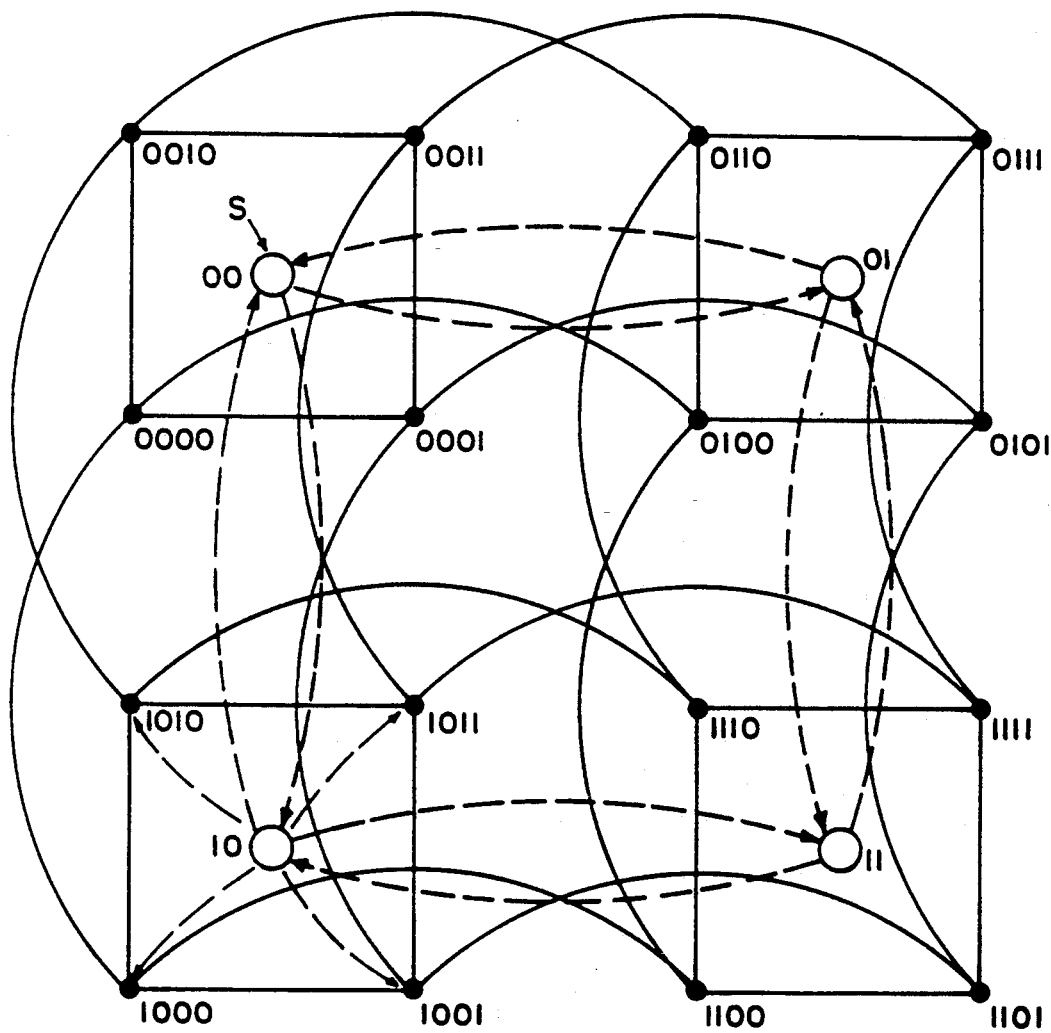
FIG. 6 illustrates an embodiment of a four-dimensional, DC-Class clock network in accordance with the present invention, with $F=2$.

For this embodiment we assign a single clock node to each subcube, and give it the same label as the associated subcube. Thus we employ $2^{\eta-\kappa}$ clock nodes labeled from 0 to $2^{\eta-\kappa}-1$. Two clock nodes are connected together in a 2-cycle (i.e. there is a link from each node to the other) if and only if their labels differ in only one bit. The clock node associated with a subcube is responsible for clocking all the nodes in that subcube. The network containing the clock nodes is itself an $(\eta-\kappa)$ hypercube. FIG. 6 illustrates a 4-cube partitioned into 4 subcubes of dimension 2, and the connections among the clock nodes. The figure also illustrates clock distribution within subcube 10, which contains nodes 1000, 1001, 1010, 1011.

The six conditions of Example 2 are imposed on this clock network. In addition, we assume that the delay from a clock node to a cell in its associated subcube is $v \pm \eta$. The four conclusions reached in Example 2 also apply here, except that the upper skew bound is $\Delta \pm 2\eta$ in this case. Note that the clock network in this case has $F = \eta - \kappa$; $\kappa \leq \eta$. However the upper skew bound is independent of both $\eta$ and $\kappa$, but does depend on the variation in delay between a node and an associated cell.

Network Design

Two basic classes of clock networks have been found to achieve constant upper skew bound, with proper timing constraints. In the definitions of the two classes, certain simplifying assumptions are initially made to emphasize the basic concepts. However, as shall be discussed, each of the assumptions in these definitions can be relaxed or modified without affecting the basic objective of constant skew bound or correctness of network operation. In effect, changing these assumptions results in other valid network classes.

Among the assumptions made initially is that each clock node is associated with one data cell. As Example 4 above demonstrates, this assumption can be easily relaxed. Another simplifying assumption is that the delay from a node to an associated cell is sufficiently small that it can be ignored. Again this assumption can be relaxed, as demonstrated above in Example 4. A third assumption is that no data cells are isolated. Otherwise, clock skew becomes irrelevant for the isolated cells. It is also assumed that all nodes in a network are of the same type, and for simplicity, that they respond to 0→1 input transitions. See El-Amawy, "Clocking Arbitrarily Large Computing Structures Under Constant Skew Bound," paper submitted to IEEE Trans. on Parallel and Distributed Systems (1991); and El-Amawy, "Properties of Branch-And-Combine Clock Networks," Tech. Report #09-91C-AE, Louisiana State University, Elec. & Compt. Engr. Dept. (1991); both of which are incorporated by reference.

The first class of networks is referred to as the Direct Cycle Class (or DC-Class). For this class:

(1) The network must be cyclic, such that each pair of directly communicating data cells is clocked by a pair of clock nodes which are linked together in at least one cycle of finite length.

(2) If L is the length (where "length" generally refers to the number of links, rather than to the physical distance) of the longest minimum length path from one input to a node to any other input to the same node, then for 0→1 triggering the timing constraints are:

$$L\Delta + \mu \leq T_h \leq L\Delta + \mu'$$

$$T_l \leq L\Delta + \mu' + \lambda - \mu$$

where $\lambda$ is the node's setup time; and $\Delta$, $\mu$, $\mu'$, $T_h$, $T_l$ are as defined earlier.

(3) If the network is regular, then L is also the length of the longest minimum length cycle containing a pair of nodes which clock a pair of directly communicating cells.

(4) The maximum skew between any two directly communicating data cells is $(L-1)\Delta$, where L is as defined in condition 2 above, and $\Delta$ is as defined earlier.

(5) If the timing constraints in condition 2 are adhered to, then the network will not oscillate.

(6) The clock source can be connected to any clock node without affecting network operation.

The networks in Examples 1, 2, and 3 all belong to this DC-Class of networks.

The second basic class of networks capable of providing constant skew upper bound is called the Indirect Cycle Class (Or IC-Class). For this Class:

(i) The network must be cyclic, such that each pair of directly communicating data cells must be clocked by either:
  (a) A pair of nodes which are linked in at least one cycle of finite length, or
  (b) a pair of nodes to which there are finite paths from a common node or from two other nodes linked together in a finite cycle.

(ii) Timing constraints on clock signals (and accordingly on node function) are determined by the topology and delays of the chosen network. The maximum skew $\phi$ between any two inputs to the same node (over the entire network) determines the timing constraints as follows:

$$\mu + \phi \leq T_h \leq \phi + \mu'$$

$T_l \geq \phi + \mu' + \lambda - \mu$ (iii) Let K be the length of the longest minimum length cycle containing any pair of nodes satisfying condition (i)(a) above. Let l be the length of longest minimum length path satisfying condition (i)(b) above. Then the skew bound between any pair of directly communicating cells is $(K-1)\Delta + [l(\alpha+\beta) - l(\alpha-\beta)] = (K-1)\Delta + 2l\beta$ where $\alpha$, $\beta$, and $\Delta$ are as defined earlier.

(iv) If the timing constraints in condition (ii) above are adhered to, then the network will not oscillate.

The networks illustrated in FIGS. 7, 8, 9, and 10 are examples of IC-Class networks. Note that these networks need not be regular, and that an IC-Class network can use fewer circuit elements than does a comparable DC-Class network, with some increase in skew.

Figure 7:
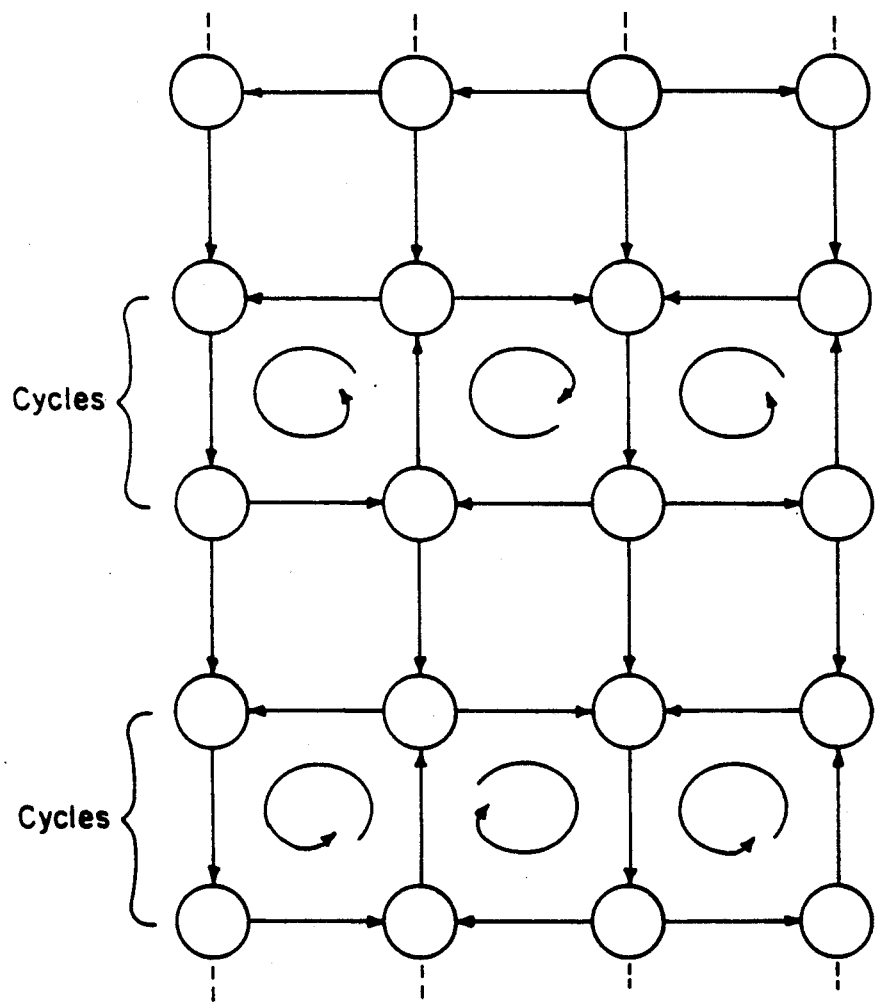
FIGS. 7, 8, 9, and 10 are examples of two-dimensional, IC-Class clock networks in accordance with the present invention.
Figure 8:
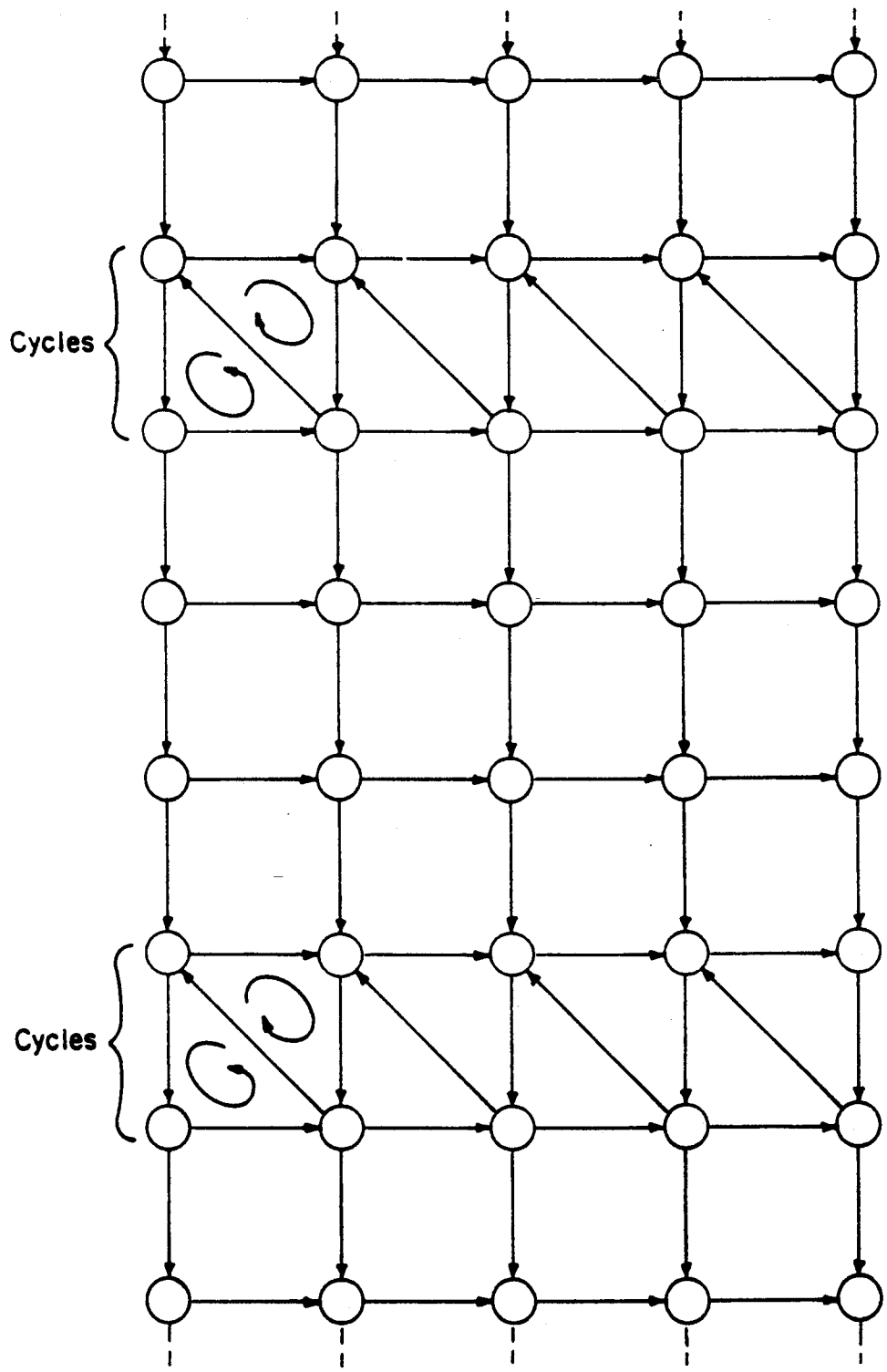
Figure 9:
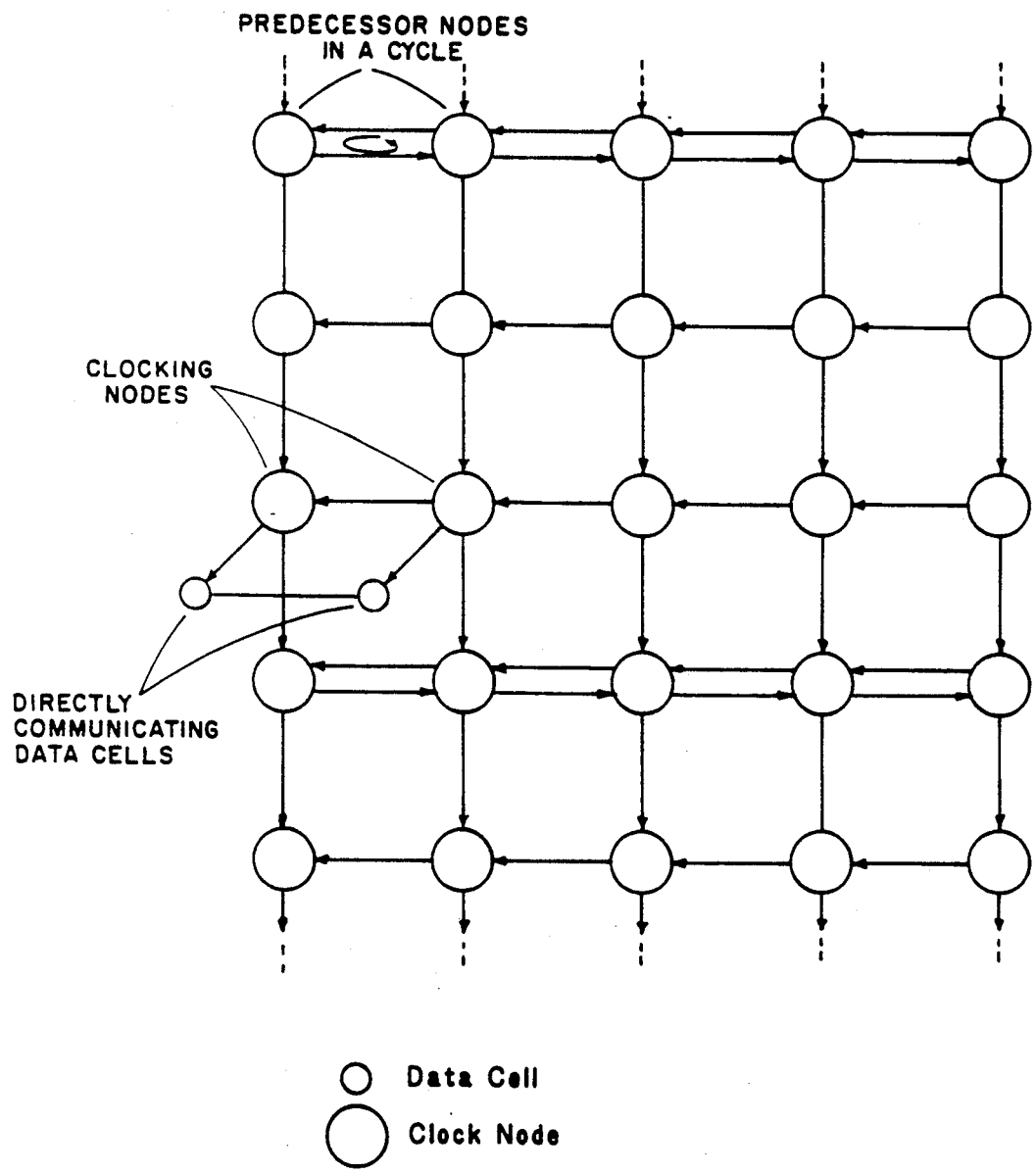
Figure 10:
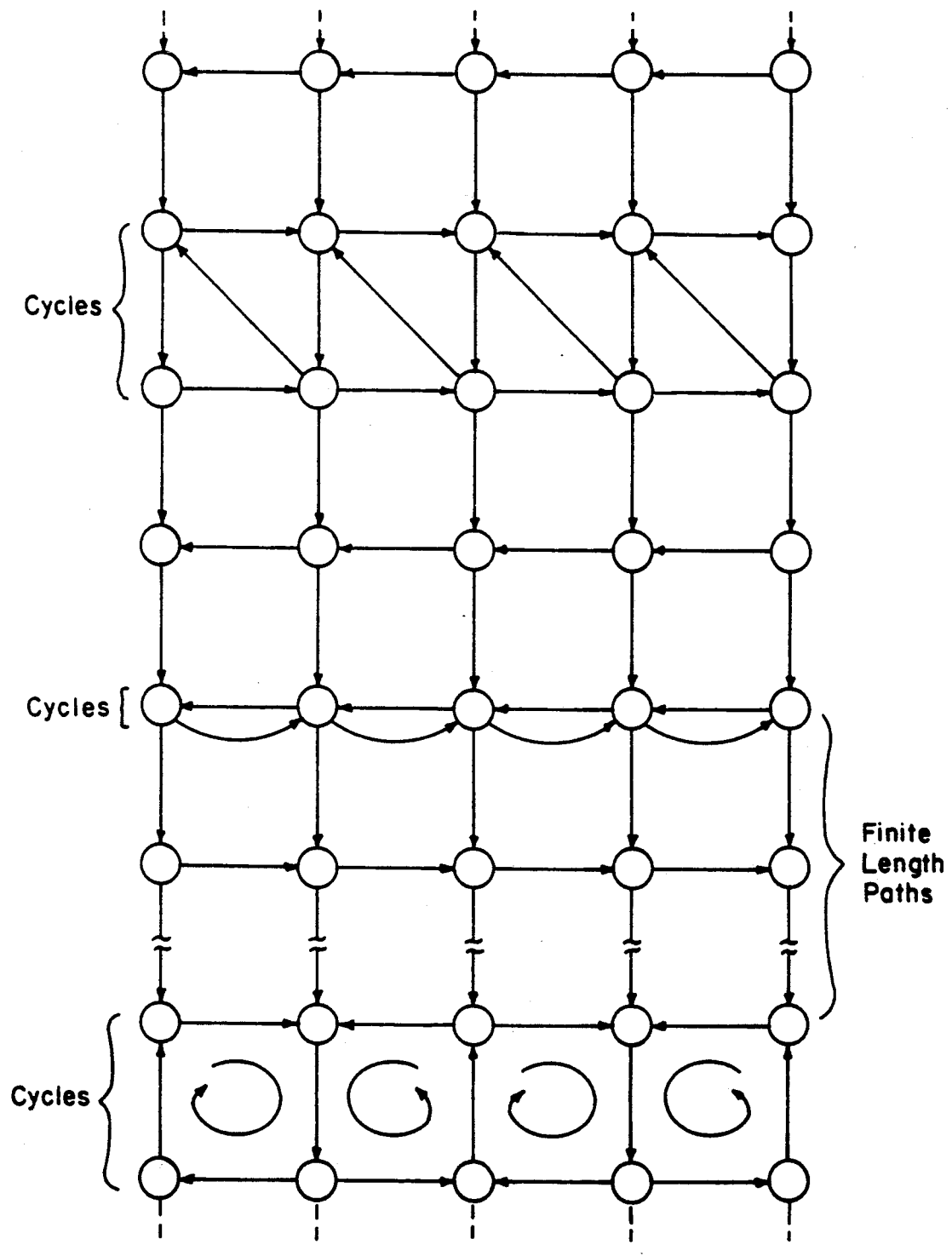

In a two-dimensional, mesh-type, IC-Class network, cycles could be placed every certain number of rows. FIGS. 7, 8, and 9 illustrate three such IC-Class networks, based respectively on the F=2 network of FIG. 4, the F=3 network of FIG. 2, and the F=4 network of FIG. 3. FIG. 10 illustrates a valid IC-Class network with cycles of different forms, and at different spacings.

The above classes may be considered as basic, because they form the foundation for other classes of networks. Other classes can be obtained by modifying or relaxing some of the assumptions. The following are examples of such extensions:

(a) Several cells clocked by one node. This assumption does not change any of the statements above, except that it is now permissible to clock two directly communicating cells from the same node. See FIG. 11.

(b) Non-zero node to cell delay. If we assume the node to cell delay to be $\nu \pm \eta$, then for each class an extra constant term of $2\eta$ should be added to the expression for upper skew bound. None of the other statements or conditions would be affected.

(c) Node responds to first $1 \to 0$ transition. In such a case the node will respond to the first $1 \to 0$ transition on any of its inputs, and ignore all other inputs per clocking period. Only the timing constraints would have to be modified by exchanging $T_h$ and $T_l$ in the above expressions.

Figure 17:
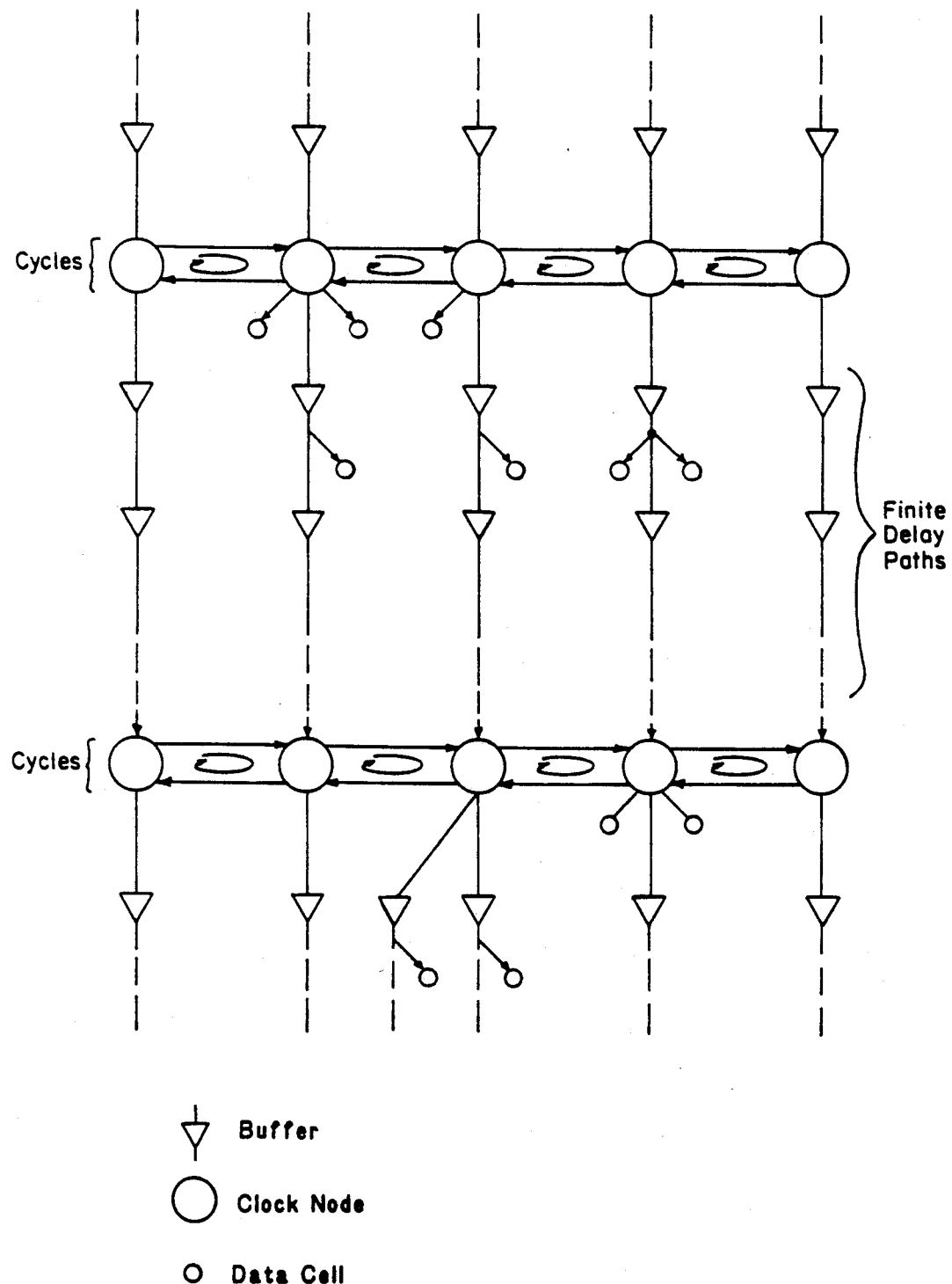
FIG. 17 illustrates an example of a two-dimensional, IC-Class clock network in accordance with the present invention.

(d) Use of buffers. The clock network need not consist only of links and nodes as previously discussed. Buffers, or equivalent devices, may also be used, as illustrated in FIG. 17. These buffers could be used in paths between cycles in an IC-Class network, as illustrated in FIG. 17. Buffers could also be placed between nodes (singly or in paths) within a cycle in either a DC-Class network or an IC-Class network (not illustrated). The maximum length of a path of such buffers must be bounded, so that only a finite amount of skew is added by the incorporation of such buffers. A pair of buffers, nodes, or both clocking a pair of directly communicating data cells must be each reachable by a sequence of one or more directed links through one or more nodes, buffers, or both, from either:
(i) the same node or buffer, or
(ii) a pair of nodes linked together in a finite cycle.

(e) Any combination of the above variants (a), (b), (c), and (d).

Buffers are used to restore signal levels or to pipeline clocking events. However, buffered clock networks alone cannot solve the skew problem for large networks. In fact, cascading large numbers of buffers can aggravate the skew problem. The advantages of branch-and-combine clocking (constant skew bound) and of buffered networks (lower hardware cost) can be combined, as illustrated in FIG. 17. Branch-and-combine cycles are placed at chosen intervals (regular or irregular) to harness skew below a selected level. Between the cycles, chains or cascades of buffers are used. Processors or data cells may be clocked by nodes or by buffers, and the number of processors clocked by a node or buffer could vary. If a node has only one input, it will act as a buffer.

Figure 12:
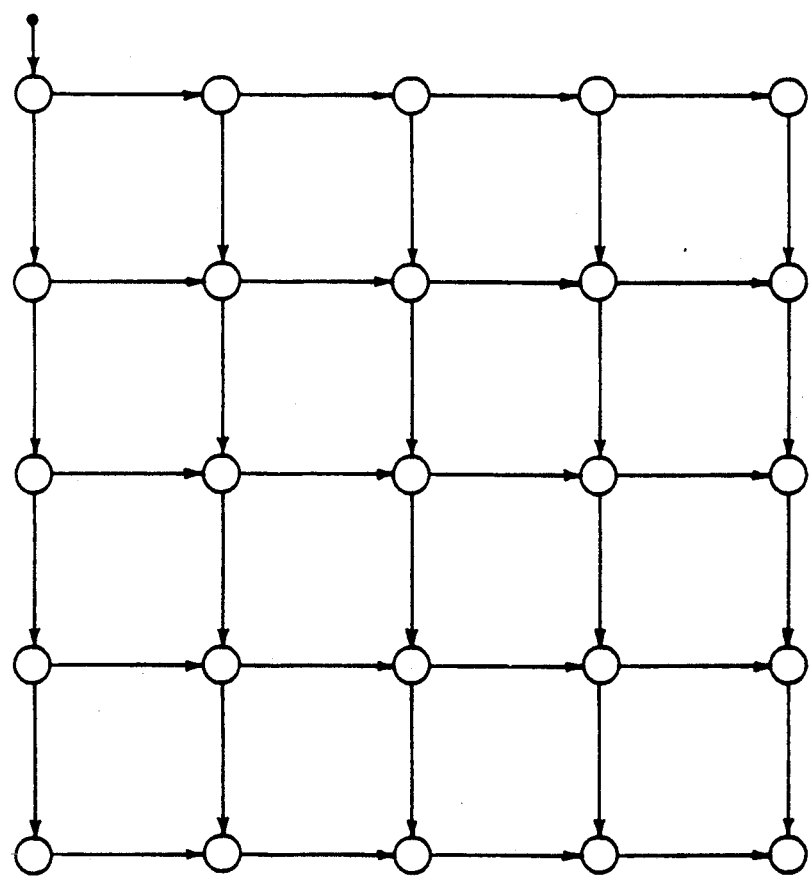
FIG. 12 illustrates an invalid network, one which is not in accordance with the present invention.

FIG. 12 illustrates an example of an invalid network. This network is completely acyclic, and thus violates the first of the above conditions. As network size grows arbitrarily, clock skew can increase without limit. This network was simulated up to a 500×500 network, and clock skew was indeed observed to increase without apparent limit as the size of the network increased.

Node Design

There are many possible designs for the clock nodes. From a logic design viewpoint, a node is simply a device that responds to the first arriving effective transition, on any of its inputs, within each clock period. Specific designs will depend on network topology, which affects both the number of inputs and outputs, and the timing constraints imposed on the clock signals. Also, the design of a node will depend on the type of effective transition, e.g. $0 \to 1$ or $1 \to 0$. Moreover, more than one node type may be included in the same network, because as FIG. 10 demonstrates, networks with irregular topologies and different cycle forms may be valid. The following node designs are only examples. Other node designs will be apparent to those skilled in the art.

Figure 13A:
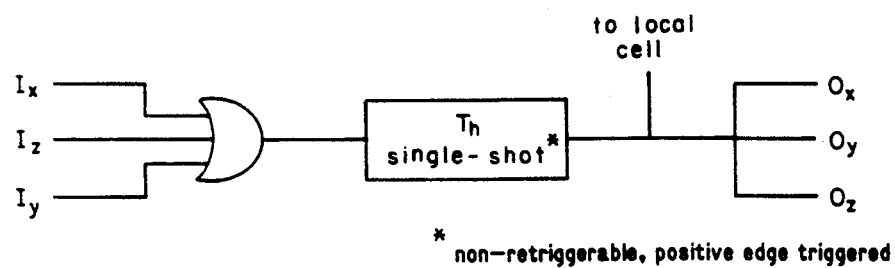
FIGS. 13(a) and 13(b) illustrate the structure and function, respectively, of a singleshot-based clock node which may be used in the present invention.
Figure 13B:
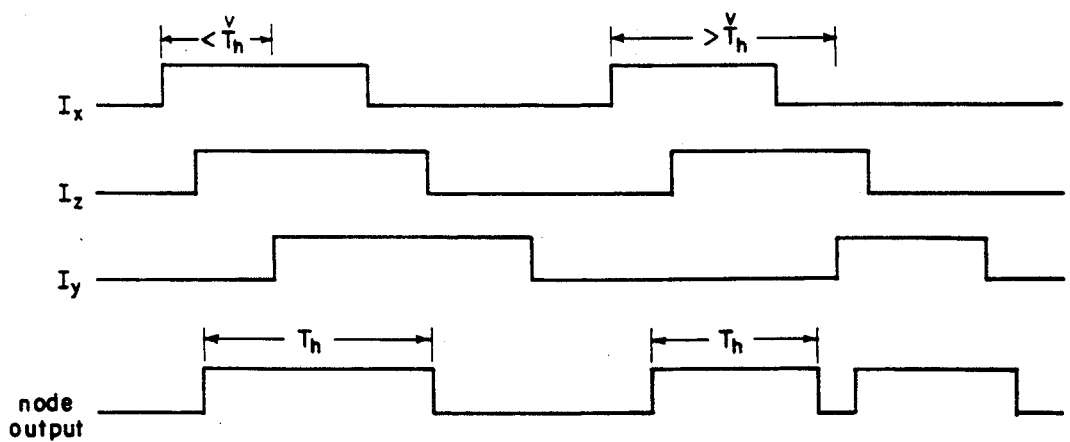

A simple design using a singleshot is illustrated in FIGS. 13(a) (structure) and 13(b) (function). The inputs $I_x$, $I_y$, and $I_z$ are combined by the OR gate, whose output triggers the singleshot. The singleshot sends a high output pulse to the cell and to outputs $O_x$, $O_y$, and $O_z$. The duration $T_h$ of the output pulse is selected within the bounds specified by the timing constraints. The singleshot is not retriggerable, and responds to a $0 \to 1$ transition at its input as long as this transition comes after a delay of at least $T_h + \lambda$ after the previous $0 \to 1$ transition at the input, where $\lambda$ is the setup time for the singleshot. This design may not be attractive in situations where the output pulse duration $T_h$ cannot be achieved or accurately controlled, or where the values of the components controlling the output pulse duration (for example a resistor and a capacitor), cannot be easily incorporated. Node delay in this design is the delay through the OR gate, plus the switching time of the singleshot.

Figure 14:
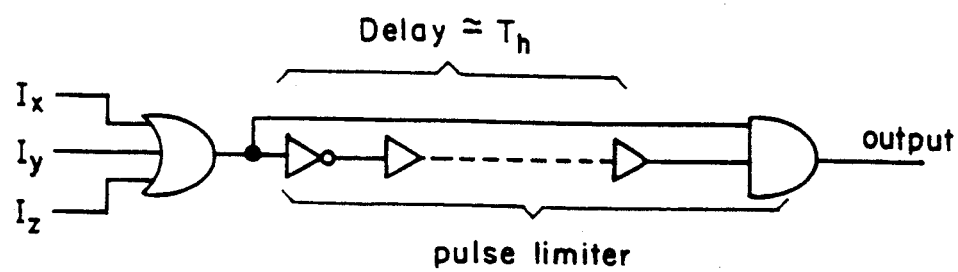
FIG. 14 illustrates a combinational-logic-based clock node which may be used in the present invention.

Another simple design using purely combinational logic is illustrated in FIG. 14. The OR gate performs the combining function. The inverter and the series of buffers invert the input signal, and provide the delay time $T_h$. The node delay in this design is essentially that through the OR and AND gates. Although this design is simple, it requires a longer clock period than that specified by the timing constraints. The output of the OR gate could be high for as long as $2T_h - \mu$, or approximately $2T_h$. This implies that the lower input to the AND gate could remain low for a period of approximately $2T_h$, starting at $T_h$ units of time after the arrival of the first 0→1 input transition. Consequently, the next clocking event must wait until the lower AND gate input goes high again. Thus, the low portion of the clock signal may have to be at least twice as long as the high portion.

A preferred, but slightly more complex node design is illustrated in FIGS. 15(a) (structure) and 15(b) (function), using flip-flops FF1 and FF2. The maximum flip-flop switching time is defined to be d. A 0→1 transition at point P at time t=0 sets FF1 at t=d. At t=$T_h$−d, FF2 is triggered. At t=$T_h$, $Q_2$ drops, causing FF1 to clear at $T_h$+d. Thus output $Q_1$ is high for a time $T_h$ as desired. The low portions of the clock signal may be as short as $T_h$+λ, where λ is the setup time for flip-flop FF1. The $T_h$−d delay can be provided by a delay line, buffers, or other means. Note that the total node delay for this design is only the delay through the OR gate and one switching time of FF1. This particular node design was used in building the 4×4, F=3 network discussed above. Cascaded buffers on a single chip were used to provide the delay. The network operated properly at 8 MHz.

Figure 15B:
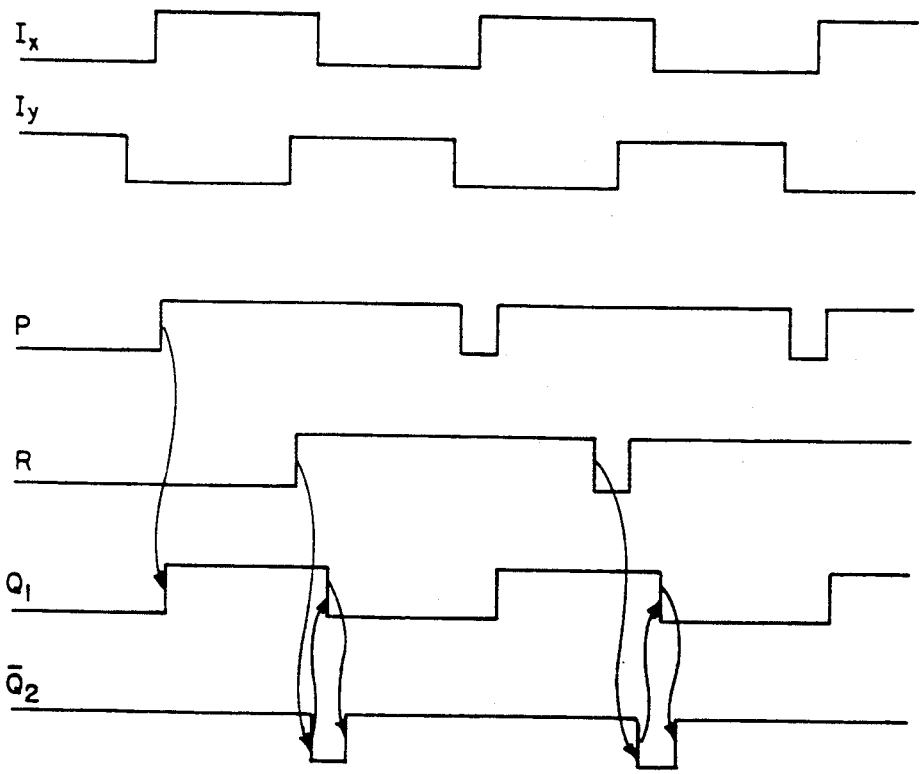
Figure 16:
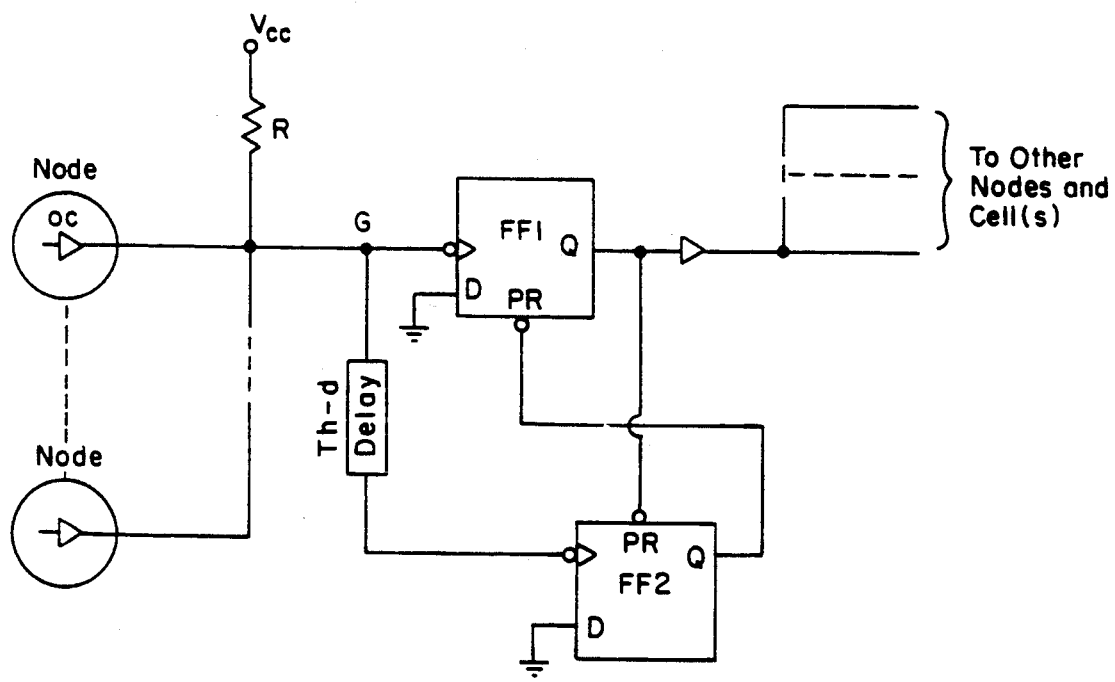
FIG. 16 illustrates the structure of an alternative flip-flop based clock node which may be used in the present invention.

A fourth node design is illustrated in FIG. 16. This design uses open collector drivers to implement the OR function, without using an OR gate. The OR function is implemented implicitly (wired-OR) by connecting all the inputs to the node together at point G, and by a pull-up resistor R at that common point G. This node triggers on the first 1→0 transition reaching the common point G. The flip-flops in this design are negative edge triggered. The operation of this design is otherwise very similar to that illustrated in FIGS. 15(a) and 15(b).

Another possibility is to design a node using asynchronous sequential theory, much the way an edge triggered flip-flop is designed. Such an approach may not provide safe operation, however, because it is not possible to guarantee that two inputs will not make transitions within a very short period of time.

The OR function at node inputs may be eliminated if the order in which input signals arrive at each node is known. To be practical, this requirement means: (1) that the delays must be time-invariant, or must change relatively uniformly; (2) that logic must be provided at each node to detect the arrival order of inputs to the node; and (3) that all node inputs, except the first arriving, should be disconnected from the node—for example, by fusing them out.

The requirement of relative time invariance is a practical assumption in many cases, because variations in delays with time can be small and uniform once a circuit has stabilized. The third requirement (fusible connections) is feasible given the ready availability of technologies known to those skilled in the art, such as that used in programmable logic arrays.

The requirement of input order detection has associated costs. On the one hand, use of such logic eliminates the need for processing by the node. The logic is used only to program the network (fuse-burning), and does not affect normal operation subsequently. On the other hand, the cost per node is a function of F, the node degree. An RS latch can be used to decide the relative arrival time of a pair of inputs. For F>2, a treelike structure of latches may be used.

All inputs to each node but one may thus be disconnected. It may also be necessary to retain an OR gate associated with each node, due to the uncertainty at the time of fabrication as to which input will ultimately remain connected.

After programming the connections to leave a single active input at each node, there is no longer the potential for lengthening clock pulse duration via the OR function. Thus the lower bound on $T_C$ can be made smaller-it need only be large enough to insure that enough time per clocking event is provided to: (1) distribute the clock signal locally (see, e.g., Fisher and Kung, above, which is incorporated by reference); (2) to compensate for skew; and (3) to perform the computation. Further, the retained OR gate naturally serves the buffering function often used in other clocking schemes. The delay through this OR gate then becomes the principal node delay in this fuse-programmed network.

Figure 11:
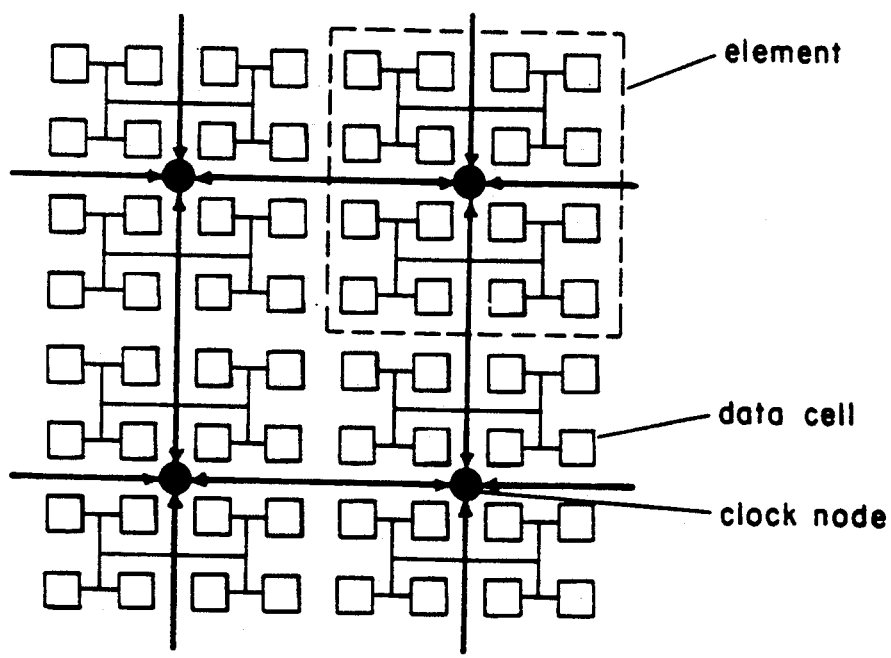
FIG. 11 illustrates a hybrid clocking system in accordance with the present invention, in which each clock node clocks several data cells.

Much of the discussion until this point has assumed that there is one data cell per clock node. This requirement may be relaxed to allow each node to clock several cells. The network may also contain buffers to clock some cells, as discussed above in connection with FIG. 17. The clock nodes are driven from a single source, and are interconnected by any valid network topology. Each node distributes the clock signal to an "element" comprising several data cells using a conventional distribution scheme. For example, FIG. 11 illustrates an embodiment of a scheme in which an H-tree is used for clock distribution within an element. The heavy lines correspond to the global clock distribution network. If the size of the elements is bounded, the skew between cells is also bounded.

If one node clocks several cells, the timing constraints on the nodes are the same as those for the corresponding clock network in which each node clocks a single cell. However, the upper bound on skew between communicating cells will increase. If $\nu \pm \eta$ is the delay between a node and an associated cell, then the upper bound on skew will increase by $2\eta$ compared to the case where each node clocks one cell.

Because of the cyclic nature of the DC-Class of networks, the clock source may be input to any clock node in such a network, without affecting the skew bound or the correctness of the network function. A consequence is that this type of network has built-in fault tolerance. Multiple clock sources could be provided to different nodes. One of the sources would be the primary source, and would be the only active source for the network, unless it failed. If the primary clock source failed, an alternate clock source would then become the source for the network. Also, if one or more links fails, (depending on the particular topology and the particular failed links), the network will frequently still function, although it may have to run slower. In both cases, fault tolerance techniques known to those skilled in the art may be used to recover from such failures. Similar, but more limited, variations in the location of the clock source in an IC-Class network will be apparent to those skilled in the art.

In addition to bounding skew in the distribution of clock signals, this invention may also be used in the distribution of data to processors, so that data skew will be bounded by a constant. In such a case, the data signal will replace the clock signal discussed above.

For additional discussion, particularly regarding the theory underlying this invention, see El-Amawy, "Clocking Arbitrarily Large Computing Structures Under Constant Skew Bound," paper submitted to IEEE Trans. on Parallel and Distributed Systems (1991); and El-Amawy, "Properties of Branch-And-Combine Clock Networks," Tech. Report #09-91C-AE, Louisiana State University, Elec. & Compt. Engr. Dept. (1991), both of which are incorporated by reference.

It is intended that the claims be interpreted to read only on physical apparatus, or on processes implemented in physical apparatus, and not to read on any purely abstract mathematical formula or algorithm which is not embodied in some physical apparatus.

I claim:

1. A circuit comprising:
   (a) a plurality of nodes and a plurality of links, said nodes being interconnected by said links such that each said node is part of at least one cycle of said nodes and links, wherein the length of the cycle is less than or equal to a maximum L;
   (b) means for supplying at least one input signal to at least one of said nodes, said input signal comprising at least one first portion and at least one second portion; wherein the duration $T_h$ of the first portion is within the bounds $$L\Delta + \mu \leq T_h \leq L\Delta + \mu'$$

wherein $\Delta$ is the maximum signal propagation delay through a node and a link connected to that node, $\mu$ and $\mu'$ are positive time intervals with $\mu' \geq \mu$; and wherein the duration $T_1$ of the second portion is at least $$T_1 \geq L\Delta + \mu' + \lambda - \mu,$$

wherein $\lambda$ is the minimum setup time of said nodes;
   (c) means, comprising at least one of said links and associated with each said node, for outputting a signal in response to each triggering event received by said node, wherein:
      (i) a triggering event is the earliest first portion of a signal, or part of such a first portion of a signal, received by said node, or subsequently the earliest first portion of a signal, or part of such a first portion of a signal, received by said node after the lapse of a time interval of duration at least $T_C$ following the most recent triggering event received by said node, wherein $T_C = 2L\Delta + \mu' + \lambda$;
      (ii) said output signal is output to at least one other node in each cycle of length less than or equal to L of which said triggered node is part; and
      (iii) the signal output by said node has a first portion of duration $T_h$ and a second portion of duration $T_1$, wherein the bounds on $T_h$ and $T_1$ are the same as stated above;
   whereby the maximum signal skew between the outputs of any two said nodes in such a cycle of length less than or equal to L is bounded by a constant.

2. A circuit as recited in claim 1, wherein each of said signals comprises a clock signal.

3. A circuit as recited in claim 2, additionally comprising:
   (a) a plurality of cells, each said cell being connected to one of said nodes; and
   (b) means, associated with each said connected node, for transmitting said output clock signal to each of said cells connected to said connected node.

4. A circuit as recited in claim 1, wherein each of said signals comprises a data signal.

5. An apparatus as recited in claim 1, additionally comprising means for selectively disabling all said links inputting to one of said nodes except for that said link which inputs the triggering event to that said node.

6. An apparatus as recited in claim 5, wherein all said links to one of said nodes have been disabled, except for that said link which inputs the triggering event to that said node.

7. An apparatus comprising a plurality of $\eta$ circuits, a 1st said circuit, a second said circuit, etc., through an $\eta$th said circuit, wherein $\eta$ is greater than 1, and wherein:
   (a) each said circuit comprises:
      (i) a plurality of nodes and a plurality of links, said nodes being interconnected by said links such that each said node is part of at least one cycle of said nodes and links, wherein the length of the cycle is less than or equal to a maximum L;
      (ii) means for supplying at least one input signal to at least one of said nodes, said input signal comprising at least one first portion and at least one second portion; wherein the duration $T_h$ of the first portion is within the bounds $$\phi + \mu \leq T_h \leq \phi + \mu'$$

wherein $\phi$ is the maximum skew between any two inputs to any one said node from said links which input to that said node, $\mu$ and $\mu'$ are positive time intervals with $\mu' > \mu$; and wherein the duration $T_l$ of the second portion is at least $$T_l \geq \phi + \mu' + \lambda - \mu,$$

wherein $\lambda$ is the minimum setup time of said nodes;
      (iii) means, comprising at least one of said links and associated with each said node, for outputting a signal in response to each triggering event received by said node, wherein:
         (A) a triggering event is the earliest first portion of a signal, or part of such a first portion of a signal, received by said node, or subsequently the earliest first portion of a signal, or part of such a first portion of a signal, received by said node after the lapse of a time interval of duration $T_C$ following the most recent triggering event received by said node, wherein $T_C = 2\phi + \mu' + \lambda$;
         (B) said output signal is output to at least one other node in each cycle of length less than or equal to L of which said triggered node is part; and
         (C) the signal output by said node has a first portion of duration $T_h$ and a second portion of duration $T_l$, wherein the bounds on $T_h$ and $T_l$ are the same as stated above; and
   (b) wherein for each integer j such that $1 < j \leq \eta$, the input signal means for the jth said circuit comprises means responsive to said output signal of at least one node of said (j−1)st circuit, wherein the delay of said responsive means is bounded by a constant; whereby the maximum signal skew between the outputs of any two said nodes in such a cycle of length less than or equal to L is bounded by a constant, and whereby the maximum signal skew between the output of any node in the jth said circuit and any node in the (j−1)st said circuit is bounded by a constant.

8. A circuit as recited in claim 7, wherein each of said signals comprises a clock signal.

9. A circuit as recited in claim 7, wherein each of said signals comprises a data signal.

10. An apparatus as recited in claim 7, wherein for each integer j such that $1 < j \leq \eta$, the input signal means for said jth circuit comprises at least one buffer.

11. An apparatus as recited in claim 7, wherein for each integer j such that $1 < j \leq \eta$, the input signal means for said jth circuit comprises at least one path of buffers, wherein the maximum length of said paths is bounded by a constant.

12. A circuit as recited in claim 7, wherein at least one of the cycles additionally comprises at least one buffer.

13. A circuit as recited in claim 7, wherein at least one of the cycles additionally comprises at least one path of buffers, wherein the maximum length of said paths is bounded by a constant.

14. An apparatus as recited in claim 11, additionally comprising means for selectively disabling all said links inputting to one of said nodes, except for that said link which inputs the triggering event to that said node.

15. An apparatus as recited in claim 14, wherein all said links to one of said nodes have been disabled, except for that said link which inputs the triggering event to that said node.

16. An apparatus as recited in claim 7, additionally comprising means for selectively disabling all said links inputting to one of said nodes except for that said link which inputs the triggering event to that said node.

17. An apparatus as recited in claim 16, wherein all said links to one of said nodes have been disabled, except for that said link which inputs the triggering event to that said node.

18. A circuit comprising:
(a) a plurality of nodes and a plurality of links, said nodes being interconnected by said links;
(b) means for supplying at least one input signal to at least one of said nodes, said input signal comprising at least one first portion and at least one second portion; wherein the duration $T_h$ of the first portion is within the bounds $$\phi + \mu \leq T_h \leq \phi + \mu'$$

wherein $\phi$ is the maximum skew between any two inputs to any one said node from said links which input to that said node, $\mu$ and $\mu'$ are positive time intervals with $\mu' > \mu$; and wherein the duration $T_l$ of the second portion is greater than 0;
(c) means, comprising at least one of said links and associated with each said nodes for outputting a signal in response to each triggering event received by said node, wherein:
 (i) a triggering event is the earliest first portion of a signal, or part of such a first portion of a signal, received by said node, or subsequently the earliest first portion of a signal, or part of such a first portion of a signal, received by said node after the lapse of a time interval greater than $T_h$ following the most recent triggering event received by said node;
 (ii) said output signal is output to at least one other node; and
 (iii) the signal output by said node has a first portion of duration $T_h$ and a second portion of duration $T_l$, wherein the bounds on $T_h$ and $T_l$ are the same as stated above;

whereby the maximum signal skew between the outputs of any two said nodes is controlled.

19. A circuit as recited in claim 18, wherein:
(a) each said node is part of at least one cycle of said nodes and said links, wherein the length of the cycle is less than or equal to a maximum L; and
(b) each of said output signals is output to at least one other node in each cycle of length less than or equal to L of which said triggered node is part;
whereby the maximum signal skew between the outputs of any two said nodes in such a cycle of length less than or equal to L is bounded by a constant.

20. A circuit as recited in claim 18, additionally comprising at least one buffer, said nodes and said buffer being interconnected by said links, wherein the number of buffers connected to one another by said links without an intervening node is less than or equal to a maximum M.

21. A circuit comprising:
(a) a plurality of nodes and a plurality of links, said nodes being interconnected by said links such that each said node is part of at least one cycle of said nodes and links, wherein the length of the cycle is less than or equal to a maximum L;
(b) means for supplying an input signal to at least one of said nodes;
(c) means, associated with each said node, for selectively disabling all said links inputting to each said node, except for that said link for each said node which inputs the first signal received by each said node; and
(d) means, comprising at least one of said links and associated with each said node, for outputting an output signal in response to each signal received by said node, wherein said output signal is output to at least one other node in each cycle of length less than or equal to L of which said receiving node is part;

whereby, following said selective disabling, the maximum signal skew between the outputs of any two said nodes in such a cycle of length less than or equal to L is bounded by a constant, regardless of whether any of the links comprising the cycle has been disabled.

22. A circuit as recited in claim 21, wherein said selective disabling means has operated, after which operation said selective disabling means may optionally be disabled.

23. A circuit as recited in claim 21, wherein each of said signals comprises a clock signal.

24. A circuit as recited in claim 23, additionally comprising:
(a) a plurality of cells, each said cell being connected to one of said nodes; and
(b) means, associated with each said connected node, for transmitting said output clock signal to each of said cells connected to said connected node.

25. A circuit as recited in claim 21, wherein each of said signals comprises a data signal.

26. A circuit as recited in claim 21, wherein at least one of the cycles additionally comprises at least one buffer.

27. A circuit as recited in claim 21, wherein at least one of the cycles additionally comprises at least one path of buffers, wherein the maximum length of said paths is bounded by a constant.

28. An apparatus comprising a plurality of $\eta$ circuits, a 1st said circuit, a second said circuit, etc., through an $\eta$th said circuit, wherein $\eta$ is greater than 1, and wherein:

(a) each said circuit comprises:

(i) a plurality of nodes and a plurality of links, said nodes being interconnected by said links such that each said node is part of at least one cycle of said nodes and links, wherein the length of the cycle is less than or equal to a maximum L;

(ii) means for supplying an input signal to at least one of said nodes;

(iii) means, associated with each said node, for selectively disabling all said links inputting to each said node, except for that said link for each said node which inputs the first signal received by each said node; and (iv) means, comprising at least one of said links and associated with each said node, for outputting an output signal in response to each signal received by said node, wherein said output signal is output to at least one other node in each cycle of length less than or equal to L of which said receiving node is part; and (b) wherein for each integer j such that $1 > j \leq \eta$, the input signal means for the jth said circuit comprises means responsive to said output signal of at least one node of said (j−1)st circuit, wherein the delay of said responsive means is bounded by a constant; whereby, following said selective disabling, the maximum signal skew between the outputs of any two said nodes in such a cycle of length less than or equal to L is bounded by a constant, regardless of whether any of the links comprising the cycle has been disabled.

29. A circuit as recited in claim 28, wherein each of said selective disabling means has operated, after which operation any of said selective disabling means may optionally be disabled.

30. A circuit as recited in claim 29, wherein for each integer j such that $1 > j \leq \eta$, the input signal means for said jth circuit comprises at least one path of buffers, wherein the maximum length of said paths is bounded by a constant.

31. A circuit as recited in claim 28, wherein for each integer j such that $1 > j \leq \eta$, the input signal means for said jth circuit comprises at least one path of buffers, wherein the maximum length of said paths is bounded by a constant.

32. An apparatus as recited in claim 28, wherein for each integer j such that $1 > j \leq \eta$, the input signal means for said jth circuit comprises at least one buffer.

33. An apparatus as recited in claim 28, wherein for each integer j such that $1 > j \leq \eta$, the input signal means for said jth circuit comprises at least one path of buffers, wherein the maximum length of said paths is bounded by a constant.

* * * * *